United States Patent [19]

Adams

[11] 4,021,017

[45] May 3, 1977

[54] THIRD MEMBER HANDLING JACK

[76] Inventor: Ernest E. Adams, 4345 E. Freemont, Phoenix, Ariz. 85040

[22] Filed: Oct. 6, 1976

[21] Appl. No.: 730,128

Related U.S. Application Data

[63] Continuation-in-part of Ser. No. 666,771, March 15, 1976, abandoned.

[52] U.S. Cl. ............................... 254/8 B; 254/124; 254/134

[51] Int. Cl.$^2$ ............................... B65G 7/08

[58] Field of Search ........... 254/2 R, 2 B, 8 R, 8 B, 254/124, 133, 134

[56] References Cited

UNITED STATES PATENTS

| | | | |
|---|---|---|---|
| 2,517,813 | 8/1950 | Wallace | 254/124 |
| 2,675,209 | 4/1954 | Freed | 254/124 |
| 3,059,785 | 10/1962 | Buckeye | 254/133 R |
| 3,797,675 | 3/1974 | Moore | 254/8 B |

FOREIGN PATENTS OR APPLICATIONS

| | | | |
|---|---|---|---|
| 1,266,917 | 6/1961 | France | 254/124 |

*Primary Examiner*—Al Lawrence Smith
*Assistant Examiner*—Robert C. Watson

[57] ABSTRACT

The disclosure relates to a handling jack for large truck gear boxes, such as third members or the like; the handling jack being adapted to move into position beneath a truck and being provided with a normally vertical column which is adapted to be pivoted on a horizontal axis at a low lever away from a position over the frame of the jack so as to be moveable into position beneath a truck and retractable from a position beneath a truck; and the column member being moveable into vertical position and provided with a handling boom thereon so as to position the handling boom above a truck gear box or third member assembly so as to freely suspend the third member and allow angular freedom of movement thereof for readily removing and replacing the gear box or third member. The jack is provided with a frame having a very low level on which the gear box may be pivoted downwardly on a horizontal axis at a low level so as to provide for the removal of the jack, the column structure and the boom, together with a gear box or third member which at that time may be carried on the frame of the jack.

12 Claims, 7 Drawing Figures

THIRD MEMBER HANDLING JACK

This application is a continuation in part of my co-pending application, Ser. No. 666,771 filed Mar. 15, 1976 now abandoned.

BACKGROUND OF THE INVENTION

The problems encountered by mechanics when removing large gear boxes, such as third members or differential mechanisms, have caused the loss of a considerable amount of time due to the limited space under a truck in which a mechanic may work for the removal of such large, heavy, unweildy gear boxes or third members. The prior art contains several floor type jacks which are used to support the bottom portion of such mechanisms, particularly third members, such that the third member is resting on an elevating portion of the jack and is therefore frictionally bound thereto. When a large heavy gear box, such as a third member of a truck, is elevated by a jack supporting the third member from the bottom thereof, the weight of the third member and its frictional engagement with the jack prevents it from being easily and readily moved relative to the jack for aligning the mechanism of a third elements, namely spline shafts or the like which are a part of the usual truck differential mechanism. Accordingly, prior art jacks supporting such heavy third members from the bottom thereof are unsatisfactory due to the fact that the frictional engagement of the third members due to the weight bearing on the jack prevents them from being moved easily and readily for alignment of bolt holes on the flanges of the third member relative to flange bolt holes in the banjo housing of the differential and axle structure. Additionally, such frictional movement and engagement of the third member with the jack on which it is carried causes great difficulty in aligning and engaging spline structures which couple the third member mechanisms with the differential mechanisms in the banjo housings of the truck axles. Additionally, prior art jacks have been unweildy due to the fact that there is a very nominal amount of clearance under the truck within which a mechanic may work as compared to the large size and bulk of a differential third member. Therefore, the removal of the third member of overhaul and the replacement thereof has been a time consuming and very difficult problem due to the cramped quarters and also the aforementioned difficulties of supporting the third member or gear box from its bottom portion which is frictionally engaged with the supporting jack in proportion to its weight bearing on the jack.

SUMMARY OF THE INVENTION

The invention comprises a handling jack for large truck gear boxes such as third members or the like. The jack of the invention has a low level portable frame which is bifurcated and on which is mounted a vertical column structure which is pivoted on a horizontal axis to the low level frame at a low level such that the horizontal axis is very close to the floor on which the jack is supported. The column structure carries a boom which is powered by an extending mechanism such as a hydraulic cylinder or the like. The end of the boom is provided with a universal joint assembly adapted to be positioned above a gear box or third member. The universal mechanism is coupled to the gear box by a bracket which disposes the universal joint member substantially above the center of gravity of the gear box so that it may be readily tiltably moved angularly and rotatably moved and thereby readily and easily aligned with mating mechanism in the banjo housing of the truck differential mechanism. At the same time, the bolt holes of the third member may be easily pivoted into position to align with the bolt holes of the banjo housing and furthermore, the usual connecting spline which couples the third member to the differential mechanism in the truck may easily and readily be engaged and put together due to the fact that the handling jack of the invention suspends the third member from above and substantially at its neutral axis or center or gravity thereby greatly facilitating the support and alignment of the third member during reinstallation.

The column structure carries an extendable means, such as a hydraulic jack, which powerfully pivots a cantilever boom structure which is longitudinally extendable so that the boom structure at its universal joint supporting mechanism is readily and easily aligned with the third member being worked upon and further, the column structure is pivotal about a vertical axis so as to permit the boom to swing in an arch generally in a horizontal direction. Also, the boom is provided with a pivotal support which is vertically adjustable relative to the vertical column structure of the jack, so as to accomodate various elevations preliminary to the actuation of the hydraulic cylinder which powers the boom angularly upward about its pivotal support on the column structure. The frame is provided with a pair of spaced apart generally horizontal frame members which are horizontally elongated and on which are slideably mounted flange receiving channels or work supports; these channels being declined downwardly and toward each other so as to properly support the bolt receiving flange of a third member and thereby support it on the handling jack frame of the invention. The frame is provided with rotatable casters so as to permit it to be easily portable and moved on a floor, such as a concrete floor or the like. The column structure of the jack on which the boom is supported is mounted nearer one of the longitudinal frame members than the other so that it is offset relative to the center of the jack and therefore permits the jack to handle a third member with its companion flange structure extending beside the column structure and therebeyond without interference. In this manner, the jack is sufficiently compact to be positioned between a pair of tandem axles for handling the third member which has its companion flanges directed forward from the rear most axle and toward the axle immediately forward thereof.

The column structure of the jack is pivoted on the frame about its horizontal axis in a direction away from the frame and gear box supporting portions of the frame.

Accordingly, it is an object of the invention to provide a very compact handling jack for removing and replacing large gear boxes, such as truck differential third members or the like, and wherein the jack is provided with a low level frame and a vertical column structure and boom which are pivotally mounted on a horizontal axis to pivot downward into low level position, away from a position over the frame, after the third member has been removed and deposited on the frame of the jack whereby the third member and the jack may be removed from the truck beneath the axle housing after the column structure has been pivoted downward out of interference with such axle housings or other obstructions beneath the truck from which the third member is being removed.

Another object of the invention is to provide a handling jack particularly adapted for use in handling third members of large trucks and which is provided with a column structure pivoted at a low level on a horizontal axis to the frame of the jack and which is extendable upward vertically when the jack is positioned beneath a truck and wherein a boom is carried by a column structure and is adapted to be extended in cantilever position; the end of the boom being provided with a universal joint means which is securable to the third member above the center of gravity thereof whereby the third member may be freely angularly and swingably pivoted in various directions so that the bolt holes in the connecting flange of the third member may be aligned with the bolt holes in the banjo housing of the axle structure of the truck and whereby spline structures may be easily and readily engaged and slideably moved together due to the fact that the third member is completely suspended and pivotally supported and free to move in various angular directions and about various axes.

Another object of the invention is to provide a very compact handling jack for removing and replacing third members from large trucks.

Another object of the invention is to provide a handling jack for handling large truck third members which carries such third members at a very low level on the frame thereof due to spaced apart frame members having adjustably moveable flange engaging channel members which permit the flange of a third member to be carried very near the floor such that its upper extremeties may clear the axle housing of a truck when the third member is being slideably removed from beneath the truck.

Another object of the invention is to provide a novel handling jack for third members of large trucks having a column and boom structure pivoted about a vertical axis and also pivoted about a horizontal axis on the frame of the jack and whereby the vertical axis is offset relative to the center of the jack so that the companion flange of a third member may be extended alongside the column structure of the jack while being removed and while being transported on the frame of the jack.

Further objects and advantages of the invention may be apparent from the following specification, appended claims and accompanying drawings.

DESCRIPTION OF THE PREFERRED EMBODIMENTS

Figure 1:
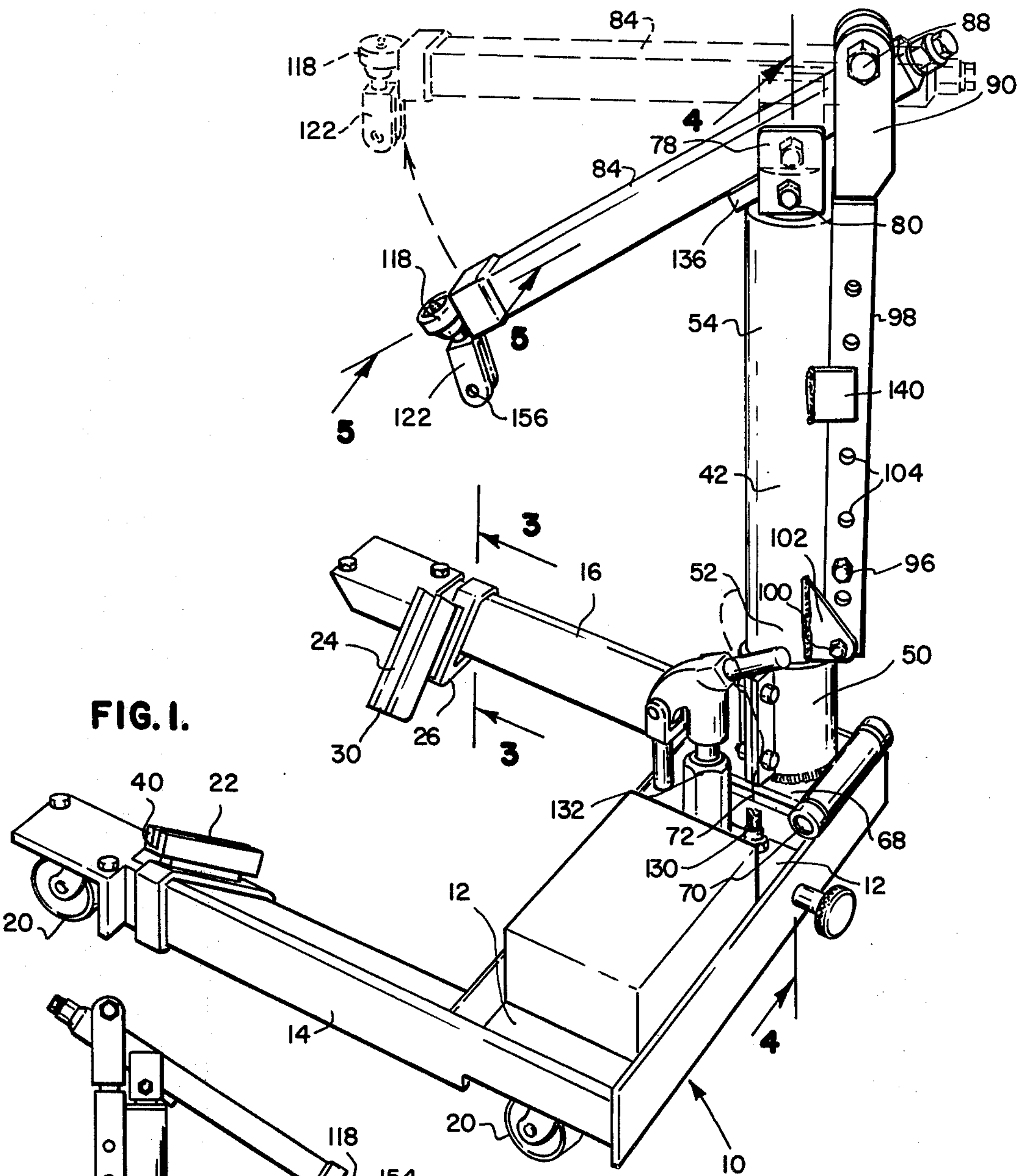
FIG. 1 is a perspective view of a handling jack in accordance with the present invention showing the varying positions of the boom thereof by broken lines.

As shown in FIG. 1, the handling jack of the invention is provided with a base frame 10 which is generally U-shaped and provided with a cross member 12 with which are rigidly connected a pair of elongated spaced apart frame members 14 and 16. Rotatable casters 20 are secured to the frame and supported for transport on a floor such as a concrete floor or the like.

Figure 2:
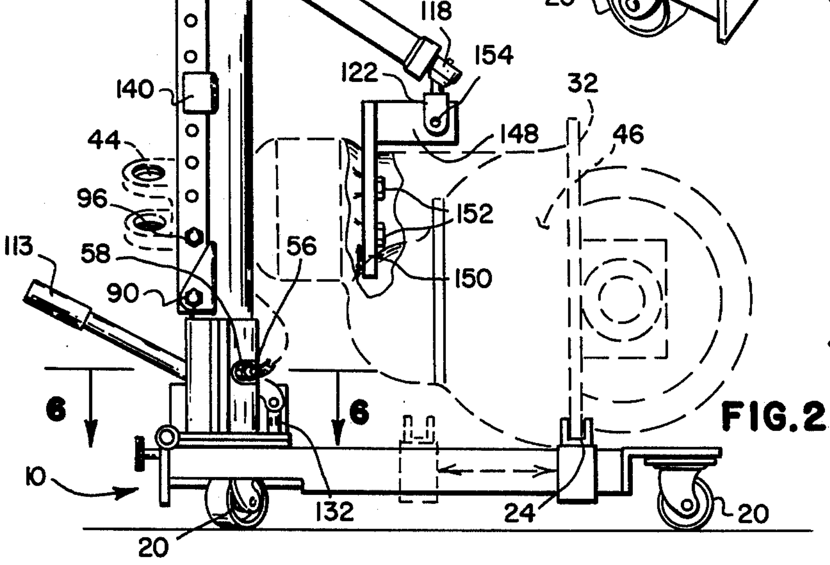
FIG. 2 is a side elevational view of a handling jack in accordance with the invention and showing by broken lines a large truck third member being handled by the jack and being placed on the frame thereof for transportation of the third member.
Figure 3:
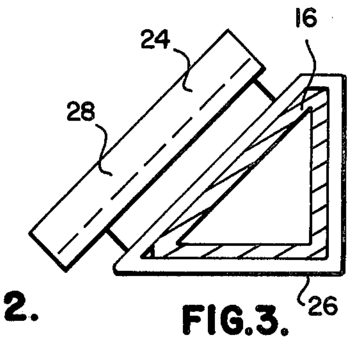
FIG. 3 is an enlarged sectional view taken from the line 3—3 of FIG. 1.
Figure 7:
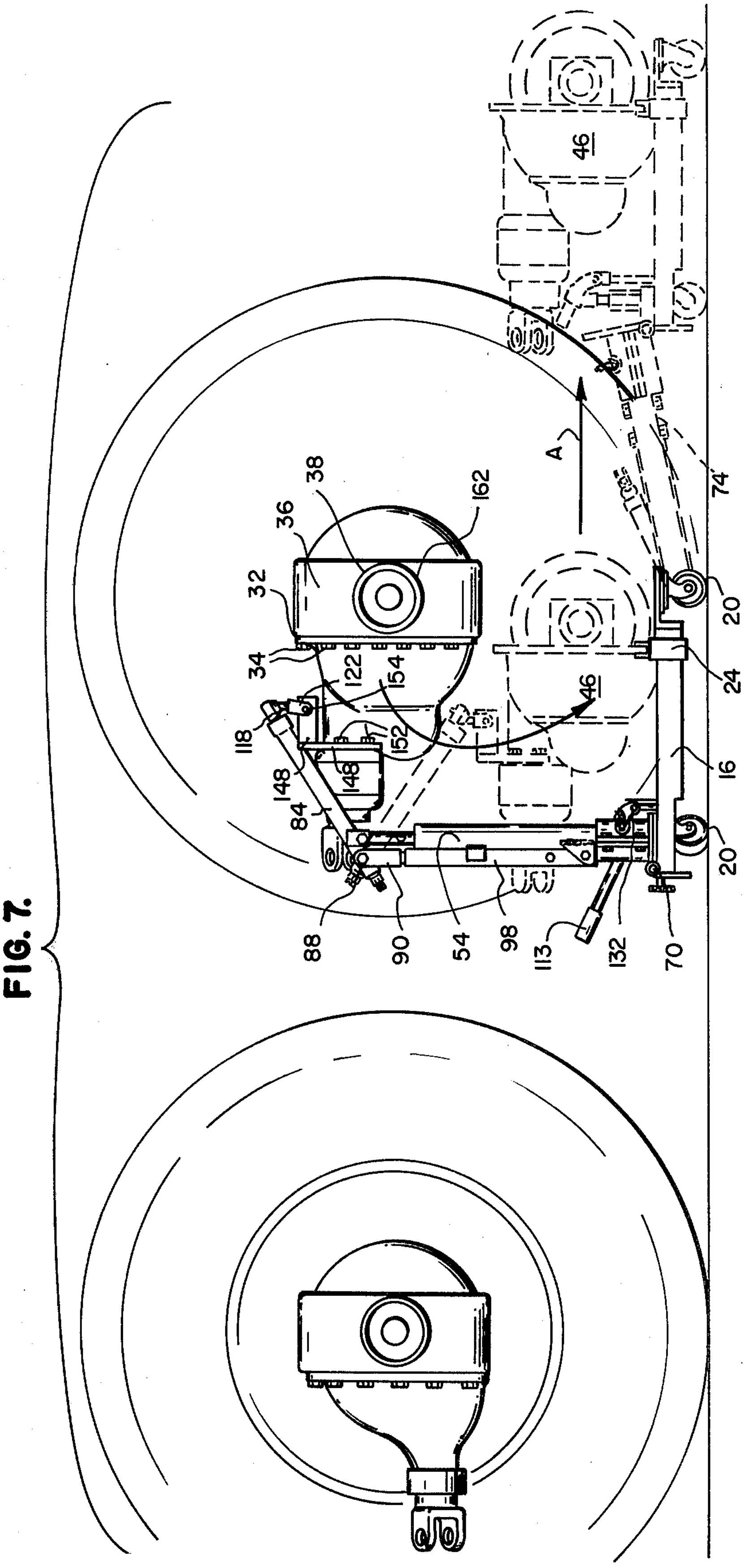
FIG. 7 is a view showing a pair of large truck tandem axles and third members and illustrating the handling jack of the invention removing a third member from one of the axle housings of the truck and showing by broken lines the progression of positions of the jack column and boom structure during the complete removal of a third member from a truck axle housing and the removal of said third member from a position beneath a truck.

Slideably mounted on the frame members 14 and 16 are a pair of work supports 22 and 24, shown best in FIGS. 1 and 3 of the drawings. These supports 22 and 24 are identical to each other except that they are opposite hand. As shown in FIG. 3 of the drawings, the work support 24 is provided with a sleeve 26 slideable longitudinally on the frame member 16 and the work support 24 is provided with a channel structure 28 carried by the slideable sleeve structure 26. This channel structure is provided with a recess or groove 30 therein adapted to receive a flange as indicated by broken lines 32 in FIG. 2 of the drawings; this flange being integral with the housing of a third member and is, as shown in FIG. 7, adapted to receive bolts 34 therethrough for connection with a banjo housing 36 of a truck rear axle and differential assembly 38.

The cross sectional shape of the channel shaped structure 28 is similar to the cross sectional shape of channel shaped structure 40 of the work support 22, as shown in FIG. 1 of the drawings.

Mounted on the cross member 12 near the frame member 16 is a column structure 42. The column structure 42 is mounted in offset relation to the middle portion of the cross member 12 so as to permit a companion flange structure 44 of a third member gear box 46 to extend backwardly from a position intermediate the frame members 14 and 16 and beyond the column structure 42.

Figure 6:
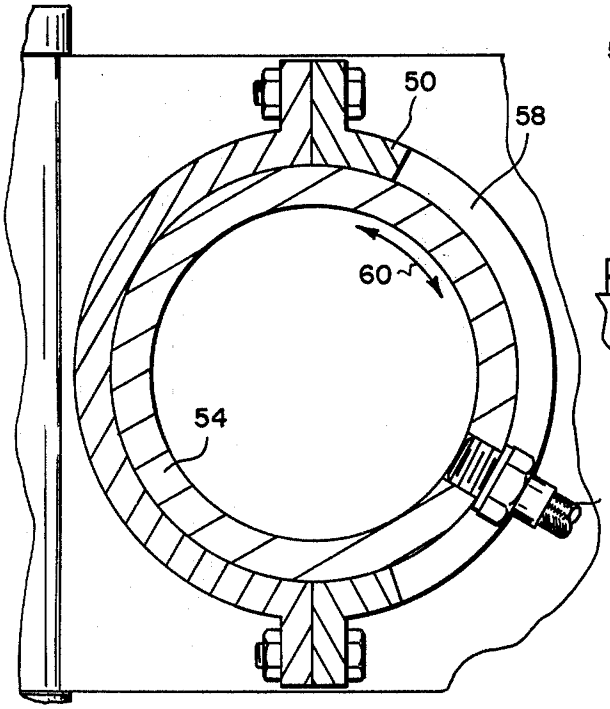
FIG. 6 is an enlarged fragmentary sectional view taken from the line 6—6 of FIG. 2.

The column structure 42 is provided with a cylindrical structure 50 in which the lower end 52 of a hydraulic cylinder 54 is moveably mounted. The hydraulic cylinder 54 is provided with a hydraulic flexible conduit 56 connected therewith and extending through a slot 58 in the structure 50. The slot 58 is shown in detail in FIG. 6 of the drawings so as to pivot the cylinder 54 about a vertical axis and to thereby allow the column structure of the invention to pivot about a vertical axis.

The cylindrical structure 50 is fixed to a hinge plate 68 which is pivoted by means of a horizontal pin or pivot means 70 mounted in a complemental hinge plate 72 carried by a cross member 12 and fixed thereto.

Figure 4:
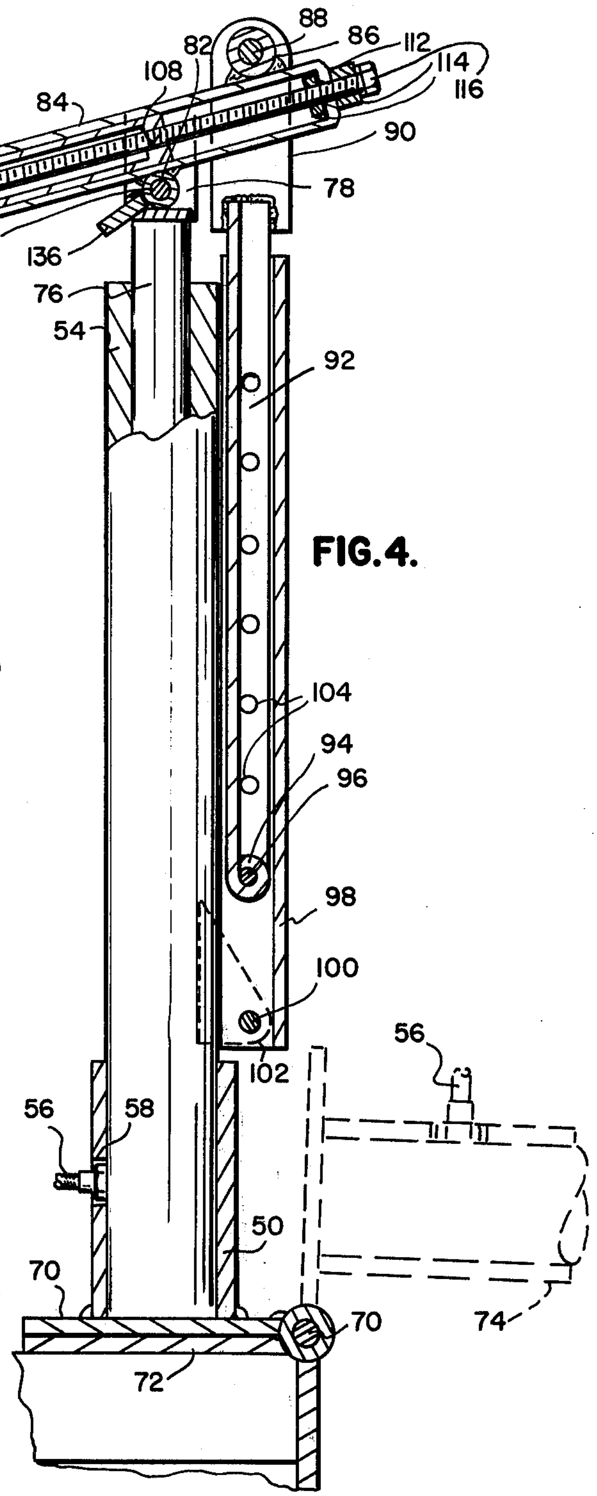
FIG. 4 is an enlarged fragmentary sectional view taken generally from line 4—4 of FIG. 1 showing details of the column and boom structure of the invention and showing by broken lines a varying or pivotal position of the column structure away from a position over the frame.

The pivot means or pin 70 allows the column and boom structure to be pivoted downwardly into a broken line position 74 in a direction away from the spaced apart frame members 14 and 16 and away from a position over the frame as shown best in FIGS. 4 and 7 of the drawings.

As shown in FIG. 4 of the drawings, the hydraulic cylinder 54 is provided with a vertically extendable plunger 76 having a yoke 78 on the upper end thereof. This yoke 78 is provided with a pivot pin 80 extending through a bushing 82 which is fixed to a hollow telescopic boom member 84. This member 84 is provided with a sleeve bearing 86 fixed thereto and a pin 88 passes through the sleeve bearing 86 and a yoke 90 coupled to an adjustably extendable bar 92 having an eye 94 through which a pin 96 extends. This pin 96 also extends through an elongated channel 98 which is pivotally mounted by a pin 100 extending through brackets 102 fixed to the hydraulic cylinder 54. It will be seen that extension of the plunger 76 of the hydraulic cylinder 54 will pivot the boom member 84 upwardly about the pivotal axis of the pin 88 which is generally horizontally disposed and that this pivotal axis 88 may be adjusted by placing the pin 96 in any one of several openings 104 in the channel member 98 so that the pivotal axis of the boom member 84 may be adjusted vertically with relation to extension of the plunger 76 of the hydraulic cylinder 54.

Telescopically mounted inside the hollow boom member 84 is a boom member 106 having an internally screwthreaded nut 108 engaged by external screwthreads of a screw 110. The screw 110 is rotatable in an end portion 112 of the boom member 84 and is longitudinally restrained in the end of the member 84 by means of shoulder elements 114 which constitute bidirectional thurst bearings preventing axial movement of the screw 100 in the boom member 84 and permitting rotation thereof so as to extend or retract the boom member 106 relative to the boom member 84.

A nut 116 is adapted for use in rotating the screw 110 in a desired direction for extending or retracting the boom member 106.

Figure 5:
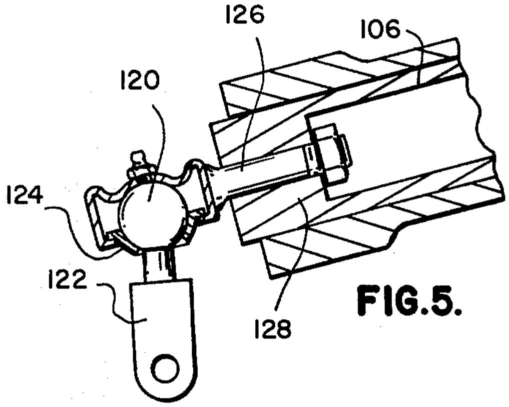
FIG. 5 is an enlarged fragmentary sectional view taken from the line 5—5 of FIG. 1.

Mounted on the extending end of the boom member 106 is a universal joint structure 118 shown in detail in FIG. 5, wherein a spherical element 120 is coupled to a slevace 122 and the spherical element 120 is held in a conforming socket structure 124 so that the ball 120 may move as a universal joint and thereby permit angular pivotal movement of the yoke 122 in various angular and rotatable directions. The universal joint structure is supported in connection with the boom member 106 by means of a bolt 126 secured in an end portion 128 of the boom member 106.

The hereinbefore mentioned hydraulic fluid conduit 56 is a flexible conduit and has sufficient length so that the opposite end thereof from that in connection with the hydraulic cylinder 54 is connected at 130, shown in FIG. 1 of the drawings. The length of this flexible conduit 56 is sufficiently long to permit pivotal movement of the column structure including the hydraulic cylinder 54 into a broken line position 74 as shown in FIGS. 4 and 7 of the drawings.

A hydraulic pump 132 shown in FIGS. 1 and 2 of the drawings, is provided with a manually operable handle 134 and is manually operable to deliver hydraulic fluid under pressure into the cylinder 54 and to cause extension of the plunger 76 in a generally upward direction as shown in FIGS. 4 and 7 of the drawings.

A boom stop member 136, shown in FIG. 4 of the drawings, is pivoted on the bolt 80 and this stop member 136 is adapted to be engaged by a lower portion of the boom member 84 when pivoted downwardly.

The cylinder 54 is provided with a pair of opposed guide members 140 straddling the channel 98 and thereby serving as a guide for the channel 98 as it pivots about the bolt or pivot 100, shown in FIGS. 1 and 4 of the drawings.

As shown in FIG. 2 of the drawings, a bracket 148 is provided with a bolt receiving structure 150 adapted to receive bolts 152 which may be bolted to the respective third member 46 so that an extendable portion of a bracket 148 receives a bolt 154 above the center of gravity of the third member 46. The bracket 148 is coupled to an upper portion of the third member 46 and the bolt 154 is substantially over the center of gravity of the third member 46 and the universal joint means 118 provides for free pivotal suspension of the third member 46 such that it may be pivoted about a vertical axis, a horizontal axis or any other axis as desired for aligning the flange 32 with the holes in the banjo housing 36 to insert the bolts 34 as hereinbefore described.

In operation, the jack is first moved to a position beneath the respective truck and between the axle housing 160 and 162, as shown in FIG. 7 of the drawings, by placing the column structure of the invention in the broken line position 74 as hereinbefore described and the jack is then moved generally to the solid line position shown in FIG. 7 wherein the pivot bolt 86 may be adjusted vertically by means of the hereinbefore mentioned bolt 96 which may be placed in any one of the openings 104 shown in FIG. 4 of the drawings to elevate the horizontal pivot pin 88 to thereby support the boom 84 at a level desirable and then the bracket 148 may be connected to the third member 46 and hereinbefore described in relation to FIG. 2 of the drawings. The bolts 34 may then be removed from the third member flange 32 at which time the third member may be moved forwardly and be suspended universally free by the universal joint 118, whereupon the hydraulic cylinder 54 may be relieved of pressure fluid thereby allowing the third member to be lowered to such a position that the flange 32 thereof is cradled in the work supports 22 and 24 which are adjusted longitudinally of the frame members 14 and 16 to a desired location as shown best in FIGS. 2 and 7 of the drawings. As soon as the third member is in a position as shown in FIG. 2 of the drawings, the bolt 154 is removed from the yoke 122 allowing the boom 84 to be pivoted about the axis of the pin 70 to a position as shown at 74 in FIG. 7 of the drawings and then the jack frame is rolled on the casters 20 in the direction of the arrow A with the column and boom structure in the broken line position 74 shown in FIG. 7 of the drawings. Thus, the third member 46 may be removed from a position beneath the truck so that it may be overhauled and reinstalled. The third member 46, when reconditioned, is carried on the frame 10 in the same manner as hereinbefore described and is moved into a position beneath a truck with the column and boom structure in the broken line position 74, shown in FIG. 7 of the drawings, and the bolt 154 is placed through the bracket 148 and the yoke structure 122 and is elevated into position to be reinstalled.

During the reinstallation, the conventional spline shaft extending from the banjo housing 36, but not shown, is easily engaged due to the fact that the third member is freely suspended by the universal joint 118 and moveable in various directions and the elevation thereof may be minutely adjusted by means of operation of the handle 113 of the hydraulic jack 132 at the same time or subsequently alignment of the third member 46 may be attained such that the bolts 34 may be extended through the holes in the flange 132 and into the corresponding holes in the banjo housing 36.

It will be appreciated by those skilled in the art that the suspension of the third member 46 from the above and its center of gravity provides a balance and a free swinging movement thereof, such as to permit very simple and easy alignment of a third member 46 upon reinstallation after it has been overhauled.

After the third member has been reinstalled and some of the bolts 34 have been tightened, the bolts 152 holding the bracket 148 onto the third member 46 may be removed and the bracket 148 may then be removed from the third member 46 and the column and boom structure of the invention may be pivoted to the broken lines 74 and the handling jack of the invention may be removed from its position from beneath the truck.

It will be obvious to those skilled in the art that various modifications may be resorted to without departing from the spirit of the invention.

I claim:

1. A handling jack for large truck gear boxes or the like comprising: a portable base frame; said frame being provided with a base adapted to carry a gear box or the like; upright column structure; pivot means pivotally mounting said column structure on said base frame; said pivot means having a generally horizontal pivotal axis; said column structure having a longitudinal axis disposed at an angle to said pivotal axis; extendable means adapted to extend said column means in a direction along said longitudinal axis; a boom pivotally coupled to said column structure on a generally horizontal axis; said pivot means permitting said column and boom structure to pivot away from a position over said base frame to a low level position; said extendable means coupled to said boom for pivoting it on said last mentioned horizontal axis; and suspension means carried by said boom for suspending and supporting a gear box, such as a third member of a truck, in connection with said boom.

2. A handling jack for large truck gear boxes or the like comprising: a portable base frame; rollers coupled to a lower portion of said frame and adapted to moveably support said base frame on a hard floor or the like; an elongated normally upright column structure; pivot means pivotally mounting said column structure on said base frame; said pivot means being on a generally horizontal pivotal axis; said column structure having a longitudinal axis disposed at an angle to said pivotal axis; extendable means adapted to extend said column means in a direction along said longitudinal axis; a boom pivotally coupled to said column structure on a generally horizontal axis; said pivot means permitting said column and boom structure to pivot away from a position over said base frame to a low level position; said extendable means coupled to said boom for pivoting it on said last mentioned horizontal axis; and suspension means carried by said boom for suspending and supporting a gear box, such as a third member of a truck in connection with said boom.

3. The invention as defined in claim 1, wherein: said suspension means comprises a universal joint means adapted to provide angular freedom of movement in several directions for suspending a third member or the like and thereby allowing angular freedom of movement of said third member so as to line up splines or other connecting structure while the said third member is suspended by said universal joint means.

4. The invention as defined in claim 1, wherein: said extendable means being a hydraulic cylinder having a plunger pivotally coupled to said boom in spaced relation to its pivotal connection with said column structure.

5. The invention as defined in claim 1, wherein: said base frame is provided with a pair of horizontally spaced apart and horizontally elongated members; and a pair of work supports adjustably moveably mounted on said elongated members; said work supports adapted to engage and support features of a gear box, such as a third member or the like.

6. The invention as defined in claim 5, wherein: said work supports are provided with a generally channel shaped cross section; said channel shaped cross section being declined downwardly such that the work supports mounted on said horizontally elongated base members are opposed and directed downwardly toward each other so as to allow the lowest possible carrying position of the flange of a third member relative to a floor on which said frame is supportable.

7. The invention as defined in claim 4, wherein: a manual pump is coupled to said cylinder and adapted to provide fluid under pressure to extend said cylinder.

8. The invention as defined in claim 1, wherein: said column structure is also pivotally mounted on said base to pivot about a generally vertical axis.

9. The invention as defined in claim 5, wherein: said column structure is pivotally mounted on said base to pivot about a generally vertical axis; said column structure being located on said base nearer to one of said horizontally elongated members than to the other one of said pair of horizontally elongated members.

10. The invention as defined in claim 1, wherein: an adjustable pivot mount is adjustable longitudinally to said column structure; said boom pivotally mounted on said adjustable pivot mount.

11. The invention as defined in claim 1, wherein: said boom is elongated and provided with means for longitudinally extending and shortening said boom relative to said column structure.

12. The invention as defined in claim 3, wherein: a bracket is connectable with said suspension means; said bracket removeably secureable to a gear box, third member, or the like, generally above the center of gravity thereof.

* * * * *